US012111022B2

(12) United States Patent
Van Bommel et al.

(10) Patent No.: US 12,111,022 B2
(45) Date of Patent: Oct. 8, 2024

(54) LIGHT EMITTING MODULE COMPRISING LED ARRAYS FOR SYMMETRICAL AND ASYMMETRICAL LIGHTING

(71) Applicant: SIGNIFY HOLDING B.V., Eindhoven (NL)

(72) Inventors: Ties Van Bommel, Horst (NL); Jeffrey Huyghe, Heule (BE)

(73) Assignee: SIGNIFY HOLDING, B.V., Eindhoven (NL)

( * ) Notice: Subject to any disclaimer, the term of this patent is extended or adjusted under 35 U.S.C. 154(b) by 0 days.

(21) Appl. No.: 18/268,506

(22) PCT Filed: Dec. 22, 2021

(86) PCT No.: PCT/EP2021/087370

§ 371 (c)(1),
(2) Date: Jun. 20, 2023

(87) PCT Pub. No.: WO2022/148663

PCT Pub. Date: Jul. 14, 2022

(65) Prior Publication Data

US 2024/0035631 A1 Feb. 1, 2024

(30) Foreign Application Priority Data

Jan. 5, 2021 (EP) .................................... 21150155

(51) Int. Cl.
*F21K 9/62* (2016.01)
*F21Y 105/12* (2016.01)
(Continued)

(52) U.S. Cl.
CPC ............. *F21K 9/62* (2016.08); *F21Y 2105/12* (2016.08); *F21Y 2105/18* (2016.08); *F21Y 2113/13* (2016.08); *F21Y 2115/10* (2016.08)

(58) Field of Classification Search
CPC .......... F21K 9/00; F21K 9/62; F21Y 2103/30; F21Y 105/12; F21Y 105/18; F21Y 113/10; F21Y 115/10
See application file for complete search history.

(56) References Cited

U.S. PATENT DOCUMENTS 6,659,632 B2 * 12/2003 Chen ...................... H05K 1/189 362/249.06
7,862,207 B2 * 1/2011 Baldwin ............ G01N 21/9501 362/240
(Continued)

FOREIGN PATENT DOCUMENTS

| | | | |
|---|---|---|---|
| CN | 202209554 | U | 5/2012 |
| DE | 202016103386 | U1 | 9/2017 |
| EP | 3282179 | A1 | 2/2018 |

*Primary Examiner* — William J Carter

(57) ABSTRACT

A light-emitting module (100) is disclosed, the light-emitting module comprising a first light-emitting diode, LED, array (104) arranged on a substrate (102). The first LED array has a first perimeter (106) and comprises a plurality of first LEDs (108) configured to emit first light. The light-emitting module further comprises a second LED array (110) arranged on the substrate. The second LED array has a second perimeter (112), smaller than the first perimeter and comprises a plurality of second LEDs (114) configured to emit second light. The second LED array is arranged off-center within the first LED array. Further, the light-emitting module comprises a controller (116) configured to individually control the first LED array and the second LED array.

13 Claims, 2 Drawing Sheets

(51) Int. Cl.

| | |
|---|---|
| ***F21Y 105/18*** | (2016.01) |
| ***F21Y 113/13*** | (2016.01) |
| ***F21Y 115/10*** | (2016.01) |

(56) References Cited

U.S. PATENT DOCUMENTS

| | | | | |
|---|---|---|---|---|
| 7,901,103 | B2 * | 3/2011 | Inoue ................ | G02F 1/133605 362/249.05 |
| 8,061,868 | B2 * | 11/2011 | Dubord ................... | F21V 19/02 362/232 |
| 8,807,794 | B2 * | 8/2014 | Huang ...................... | F21K 9/00 313/511 |
| 10,429,050 | B2 | 10/2019 | Fukasawa | |
| 2004/0022057 | A1 * | 2/2004 | Lee ......................... | F21K 9/232 362/249.14 |
| 2005/0122487 | A1 | 6/2005 | Koyama et al. | |
| 2011/0134642 | A1 * | 6/2011 | Lee ........................... | F21K 9/00 362/249.06 |
| 2011/0267812 | A1 * | 11/2011 | Van De Ven ............. | F21K 9/23 362/249.06 |
| 2013/0032820 | A1 | 2/2013 | Wirth | |
| 2013/0249407 | A1 | 9/2013 | Kashiwagi et al. | |
| 2016/0215961 | A1 | 7/2016 | Kjeldsen et al. | |
| 2017/0020084 | A1 | 1/2017 | Alfier et al. | |
| 2017/0122504 | A1 | 5/2017 | Wimmer et al. | |

* cited by examiner

LIGHT EMITTING MODULE COMPRISING LED ARRAYS FOR SYMMETRICAL AND ASYMMETRICAL LIGHTING

CROSS-REFERENCE TO PRIOR APPLICATIONS

This application is the U.S. National Phase application under 35 U.S.C. § 371 of International Application No. PCT/EP2021/087370, filed on Dec. 22, 2021, which claims the benefit of European Patent Application No. 21150155.6, filed on Jan. 5, 2021. These applications are hereby incorporated by reference herein.

TECHNICAL FIELD

The present application relates generally to the field of lighting. More specifically, it relates to a light-emitting module for symmetrical and asymmetrical lighting.

BACKGROUND

Light-emitting diode (LED) based lighting solutions are becoming a commodity in general lighting. In recent years, the focus of development has increasingly moved from reducing cost and improving performance to adapting lighting solutions to human needs and preferences. It is therefore an aim to improve human-centric lighting design and lighting effects of LEDs luminaires.

In US 2005/122487 multiplicities of red LED cell(s), green LED cell(s), and blue LED cell(s) are arrayed in two dimensions on a single light source substrate so as to form LED plane light source(s). First lens array(s) and second lens array(s) are disposed on side(s) of the LED plane light source(s) from which light exits.

US2017020084 discloses various lighting devices, e.g. for greenhouse lighting, including a substrate with an array of electrically-powered light radiation sources, e.g. power LEDs. The sources of array are arranged in a first set and in a second set to emit a blue radiation and a red radiation, respectively.

SUMMARY

It is therefore an object of the present disclosure to meet at least some of the above-mentioned goals, and to provide an improved lighting module.

This and other objects are achieved by means of a light-emitting module as defined in the appended independent claim. Other embodiments are defined by the dependent claims.

According to the present disclosure, a light-emitting module is provided. The light-emitting module comprises a first light-emitting diode (LED) array arranged on a substrate. The first LED array has a first perimeter. The first LED array comprises a plurality of first LEDs, that are configured to emit first light.

A second LED array is arranged on the substrate. The second LED array has a second perimeter, which is smaller than the first perimeter. The second LED array comprises a plurality of second LEDs configured to emit second light. The second LED array is arranged off-center within the first LED array.

The light-emitting module further comprises a controller configured to individually control the first LED array and the second LED array.

The off-center arrangement of the second LED array within the first LED array may allow for different light effects. For example, if the light emitted by the first LED array is different, e.g. in color and/or intensity, from light emitted by the second LED array, light emitted by the light-emitting module may have an asymmetric effect. An asymmetric light effect may be perceived as more playful and may be used for tricking the eyes of a person walking around it.

For example, if the first LED array is controlled to emit light with a higher intensity than the second LED array, the distribution of light emitted by the light-emitting module may be shifted toward the first LED array, and may therefore be asymmetric relative to a central/middle point of the light-emitting module. As another example, if the first LED array is controlled to emit light with a different color than the second LED array, the color of the light emitted by the light-emitting module may be asymmetric relative to a central/middle point of the light-emitting module.

A LED array may be an (organized/arranged) assembly of LEDs (e.g. LED dies, packages or chips). In a LED array, the LEDs may be arranged at a distance from one another. The distance between two neighboring LEDs may be referred to as pitch.

The perimeter of a LED array may be an (imaginary) outline within which all LEDs of the LED array are arranged. The first and/or second perimeter may for example be curved, such as circular, oval or elliptical. The first and/or second perimeter may for example be angular, such as a polygon having e.g. 6, 8 or more sides.

The second LED array being arranged within the first LED array may be equivalent to the perimeter of the second LED array being arranged within the perimeter of the first LED array.

The first light, emitted by the first LEDs, may have a defined color and/or intensity. The first light may have a variable color and/or intensity.

The second light, emitted by the second LEDs, may have a defined color and/or intensity. The second light may have a variable color and/or intensity.

One example of a type of LED having a variable color is RGB LEDs. Such LEDs combine red, green and blue LEDs in one package. By varying the intensity of light emitted by each of the red, green and blue LEDs, the color of the combined LED light may be varied to achieve a large range of colors.

Alternatively, a LED array may comprise at least two types of LEDs, each type emitting light with a specific color. By varying the intensity of light emitted by each of the types of LEDs, the combined light emitted by the LED array may be varied in a range between the specific colors emitted by the types of LEDs.

The controller may be configured to vary one or more of an intensity, a color temperature and a color point of light emitted by the first and/or the second LED array.

The color point (or chromaticity) of the light is a specification of the color of the light, without taking the luminance or intensity of light into account.

The color temperature describes different types of white light. Whiteness of light-sources is often described in relation to ideal black body radiators. An ideal black body radiates light with different wavelengths depending on its temperature. Warmer light comprises more red wavelengths and corresponds to a relatively low color temperature (below 3500 K), neutral white is in the medium range (3500 K-5000 K), and colder light comprises more blue wavelengths and corresponds to a higher color temperature (over 5000 K).

The correlated color temperature (CCT) of a light source is the temperature (expressed in kelvin, K) of an ideal black body radiator showing the most similar color. The black body line, or black body locus (BBL) is a line in a particular chromaticity space which connects the color points for light emitted by a black body at different temperatures.

According to some embodiments, the first perimeter may enclose a first surface area, and the second perimeter may enclose a second surface area. At least 70% of the second surface area may be arranged in one half of the first surface area.

A density of LEDs in the first surface area may be at least substantially equal to a density of LEDs in the second surface area. It will be appreciated that the second surface area is arranged within the first surface area, such that LEDs arranged in the second surface area are also arranged in the first surface area.

For example, the first LED array may comprise at least 10 first LEDs. The second LED array may comprise at least 6 second LEDs.

According to some embodiments, an optical structure may be arranged along the second perimeter. The optical structure may be arranged to redirect the first light and second light toward the substrate and/or toward a housing in which the substrate is arranged.

The optical structure may improve mixing of light. Specifically, the optical structure may improve a mixing of light emitted by the second LED array inside the second perimeter, and a mixing of light emitted by the first LED array outside the second perimeter. An increased mixing of light may provide a reduction in the number of LEDs necessary to achieve the desired light effects resulting from illumination of the first LEDs and/or second LEDs.

For example, the substrate and the housing may form a mixing chamber for improving mixing of light.

In some embodiments, the substrate may have a reflectivity of at least 80%.

According to some embodiments, the light-emitting module may further comprise a semi-reflective light exit window arranged to couple out light emitted by the first LED array and the second LED array.

A semi-reflective window may increase the mixing of light, as some of the light emitted by the first and the second LED array may be reflected back into a mixing chamber formed between the semi-reflective light exit window and the substrate.

In some embodiments comprising a semi-reflective light-exit window, the optical structure may have a height H which is in the range of 0.3-0.7 times a gap G between the substrate and the semi-reflective window, i.e. $0.3G \leq H \leq 0.7G$.

Optical structures with a height in this range may provide some mixing of light between the first area (inside the first perimeter and outside the second perimeter) and the second area (inside the second perimeter), thereby minimizing the appearance of a sharp line between the two areas.

In some embodiments comprising a semi-reflective light-exit window, the gap height G between the substrate and the semi-reflective light-exit window may be 1-4 times an average pitch (P) between the LEDs, i.e. $P \leq G \leq 4P$ Such a relation between the pitch and the gap height may further improve the light mixing.

The first and/or second LEDs may be uniformly distributed such that the pitch between the LEDs is the same or at least substantially the same.

In some embodiments, the semi-reflective light exit window may have a reflectivity in the range 30-80% for light emitted by the first LED array and the second LED array. Thus, some light may be reflected back, which may provide a more even lighting surface, while mixing light emitted by the first LED array with light emitted by the second LED array may still be limited.

In some embodiments, the semi-reflective light exit window may be a diffuser. For example, the semi-reflective light exit window may comprise a polymer including particles of one or more of: aluminum(III)oxide ($Al_2O_3$), barium sulfate ($BaSO_4$) and titanium dioxide ($TiO_2$).

According to some embodiments, the first perimeter may be (at least substantially) circular and have a first radius R1. The second perimeter may be (at least substantially) circular and have a second radius R2. The first and second radii may be related such that $0.3R1 \leq R2 \leq 0.8R1$.

In embodiments in which the first and the second perimeters are (at least substantially) circular, the second LED array, being circular, may represent the sun if the first LED array is turned off while the first LED array may have a crescent shape and represent the moon when the second LED array is turned off.

In embodiments in which the first and second radii are related such that $0.3R1 \leq R2 \leq 0.8R1$, light effects obtained by the first LED array and the second LED array emitting different types of light (e.g. different color and/or different intensity) may be improved.

According to some embodiments, first LEDs of the first LED array are arranged surrounding the second LED array.

For example, first LEDs of the first LED array may be arranged such that the pitch between neighboring first LEDs around the second perimeter is the same (i.e. similar in size), and no larger gap between neighboring first LEDs around the first perimeter is formed.

According to some embodiments, the second LED array may further comprise (at least one) first LEDs. The first light may have a first LED color temperature T1, and the second light may have a second LED color temperature T2. A difference between the first LED color temperature T1 and the second LED color temperature T2 may be larger than (or substantially equal to) 500 K i.e. $|T1-T2| \geq 500$ K.

Specifically, the second LED color temperature T2 may be at least 500 K higher than the first LED color temperature T1, i.e. $T2-T1 \geq 500$ K.

In such embodiments, the second LED array may emit first light, second light or a mixture of first light and second light. In some embodiments, the controller may be configured to control the first LEDs of the second array independently from the second LEDs of the second array. In other words, the controller may be configured to independently control a first group of LEDs in a LED array and a second group of LEDs in the same LED array. The color (or color temperature) of the combined light emitted by the second LED array may then be varied in a range between the color (temperature) of the first light and the color (temperature) of the second light.

Further, light effects may be achieved with the first LED array and the second LED array emitting light with different intensities and/or with different colors.

According to some embodiments, the first LED color temperature T1 may be lower than, or at least substantially equal to, 3500 K. The second LED color temperature may be higher than, or at least substantially equal to, 4000 K.

Warm light with a color temperature lower than 3500 K may be perceived as comfortable and may provide a pleasant atmosphere in for example a home setting.

Cold light with a color temperature higher than 4000 K may be perceived as sharper and provide interesting lighting effects. For example, moonlight is typically around 4200 K.

An asymmetrical combination of warmer light and colder light may provide interesting light distribution. For example, in embodiments in which the intensity of warm light emitted by the first LED array and/or cold light emitted by the second LED array may be varied, the color temperature of the combined light may be varied.

According to some embodiments, the second LED array may be free of first LEDs. The first light may have a first LED color temperature T1, and the second light may have a second LED color temperature T2. A difference between the first LED color temperature T1 and the second LED color temperature T2 may be smaller than (or at least substantially equal to) 300 K, i.e. $|T1-T2|300$ K.

For example, the difference between the first LED color temperature T1 and the second LED color temperature T2 may be smaller than 200 K. More specifically, the first LED color temperature T1 may be at least substantially equal to the second LED color temperature T2.

In such embodiments, the controller may be configured to control the intensity of the first LED array and the second LED array independently.

According to some embodiments, the second LED array may further comprise third LEDs configured to emit third light. The third light may have a third LED color temperature. The first LED color temperature T1 of the first light may be at least 500 K higher that the third LED color temperature T3, i.e. $T1-T3 \geq 500$ K.

In such embodiments, the second LED array may comprise a combination of second and third LEDs and may provide a combination of second and third light. The second LED array may alternatively comprise a combination of first and second and third LEDs and may therefore be able to provide a combination of first, second and/or third light.

According to some embodiments, light emitted by the first LED array may have a first array color temperature CT1. Light emitted by the second LED array may have a second array color temperature CT2. The controller may be configured to select between at least two control modes. In a first control mode, both the first LED array and the second LED array may be turned on. The second array color temperature $CT2_1$ may be (at least substantially) equal to the first array color temperature $CT1_1$. That is, $CT1_1=CT2_1$ (or $CT1_1 \approx CT2_1$), where the subscript 1 indicates the value of the array color temperature in the first mode.

In the second control mode, the second LED array is turned on.

In the second control mode, the first LED array may be turned off. Alternatively, in the second control mode, the first LED array may be turned on and controlled to emit light with a first color temperature $CT1_2$ that is the same as the first color temperature $CT1_1$ but with a lower intensity than in the first mode. That is, $CT1_2=CT1_1$. Denoting the intensity of the light emitted by the first LED array in the first mode $I1_1$ and in the second mode $I1_2$, the intensities are controlled such that $I1_2 \neq I1_1$.

According to some embodiments, in the second control mode, the second array color temperature may be the same as in the first control mode, i.e. the same as the first array color temperature CT1. That is, $CT2_2=CT2_1$ ($=CT1_1$).

According to some embodiments, in the second control mode, the second array color temperature $CT2_2$ may be different from the second array color temperature $CT2_1$ in the first control mode, i.e. different from the first array color temperature CT1. That is, $CT2_2 \neq CT2_1$.

In the first control mode, the first and the second LED arrays may be controlled to provide light with the same color temperature.

The second control mode may provide a difference in intensity and/or color of the emitted light.

According to a second aspect of the present disclosure, a luminaire is provided. The luminaire comprises a light-emitting module as described above with reference to any of the preceding embodiments.

It will be appreciated that the luminaire may further comprise any or all of the following: parts designed to distribute the light, parts designed to position and protect the light-emitting module, and parts to connect the light-emitting module to a power supply.

It is noted that other embodiments using all possible combinations of features recited in the above described embodiments may be envisaged. Thus, the present disclosure also relates to all possible combinations of features mentioned herein.

BRIEF DESCRIPTION OF DRAWINGS

Exemplifying embodiments will now be described in more detail, with reference to the following appended drawings.

As illustrated in the figures, the sizes of the elements and regions may be exaggerated for illustrative purposes and, thus, are provided to illustrate the general structures of the embodiments. Like reference numerals refer to like elements throughout.

DETAILED DESCRIPTION

Exemplifying embodiments will now be described more fully hereinafter with reference to the accompanying drawings in which currently preferred embodiments are shown. The invention may, however, be embodied in many different forms and should not be construed as limited to the embodiments set forth herein; rather, these embodiments are provided for thoroughness and completeness, and fully convey the scope of the invention to the skilled person.

Figure 1:
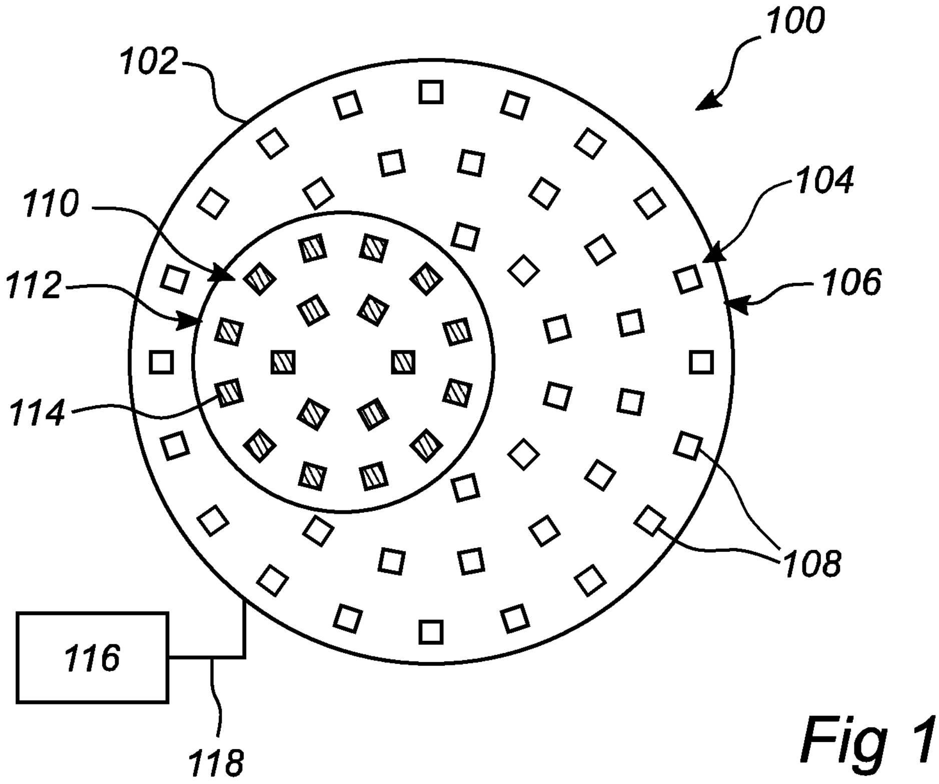
FIG. 1 is an illustration of a light-emitting module, in accordance with some embodiments.

With reference to FIG. 1, a light-emitting module 100, in accordance with some embodiments, will be described.

FIG. 1 is a schematic illustration of a light-emitting module 100. The light emitting module comprises a substrate 102, such as a printed circuit board (PCB). On the substrate 102, a first light-emitting diode (LED) array 104 and a second LED array 110 are arranged. The first LED array 104 comprises a plurality of first LEDs 108 arranged within a first perimeter 106. The second LED array 110 comprises a plurality of second LEDs 114, arranged within a second perimeter 112. The second LED array 110 is arranged off-center within the first LED array 104. The relation between the first and second perimeters 106, 112 will be further described below with reference to FIG. 2.

In FIG. 1, all LEDs (first LEDs 108) which are arranged inside the first perimeter 106 and outside the second perimeter 112 are part of the first LED array 104. All LEDs (second LEDs 114) which are arranged inside the second perimeter 112 are part of the second LED array 110. The LEDs 108 of the first array 104 may be interconnected. The LEDs 114 of the second array 110 may be interconnected.

The LED module 100 further comprises a controller 116, which is connected to the first and second LED arrays 104, 110 via a connector 118. The controller 116 is configured to individually control the first LED array 104 and the second LED array 110.

In an embodiment, the controller 116 may be configured to individually turn the first LED array 104 and the second LED array 110 on and off without varying parameters such as the intensity and the color temperature. In other embodiments, the controller may be configured to individually control an intensity and/or a color of light emitted by the LEDs of the first LED array 104 and/or the second LED array 114.

For example, the first LEDs 108 are adapted to emit first light, which may have a first LED color temperature T1, and the second LEDs 114 are adapted to emit second light, which may have a second LED color temperature T2. The LED color temperatures may be related such that $|T1-T2|500$ K, and specifically, the first LED color temperature may be higher, such that $T2-T1\geq 500$ K. For example, the LED color temperatures may be $T1\leq 3500$ and $T2\geq 4000$. In the present embodiment, the first LED array 104 comprises only first LEDs 108, meaning that the first LED array emits first light, and that the first array color temperature is equal to the first LED color temperature CT1=T1. Similarly, the second LED array 110 comprises only second LEDs 114, meaning that the second LED array emits second light, and that the second array color temperature is equal to the second LED color temperature CT2=T2.

Figure 2:
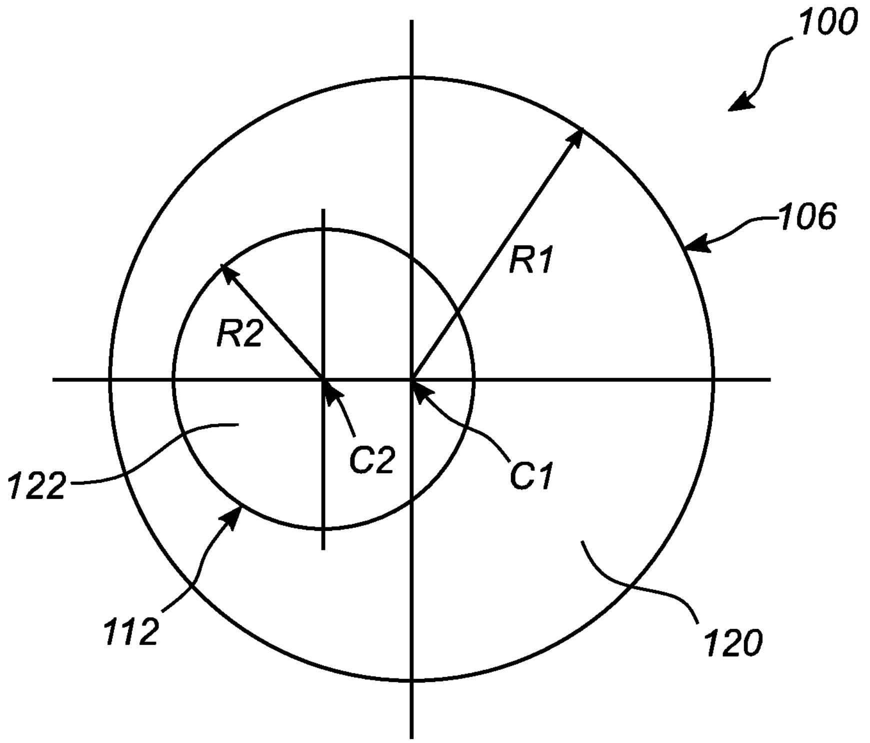
FIG. 2 shows an example of a second perimeter positioned inside a first perimeter, in accordance with some embodiments.

With reference to FIG. 2, the relation between, and relative positions of, the first perimeter 106 and the second perimeter 112, in FIG. 1 will be further described.

The first perimeter 106 is circular, having a first radius R1. The second perimeter 112 is also circular, having a second radius R2, which is smaller than the first radius. Specifically, the first and second radii are related such that $0.3R1\leq R2\leq 0.8R1$.

The second LED array 110 is arranged within the first LED array 104, such that the second perimeter 112 is arranged within the first perimeter 106. Further, the second LED array 110 is arranged off-center within the first LED array 104 such that a center point C2 of the second perimeter 112 is arranged in a different position than the center point C1 of the first perimeter 106. Expressed differently, the center C1 of the first perimeter 106 does not coincide with the center C2 of the second perimeter 112 and an optical axis of the first perimeter passing through C1 does not either coincide with an optical axis of the second perimeter passing through C2.

The first perimeter 106 encloses a first surface area 120 and the second perimeter encloses a second surface area 122. The second LED array 112 is arranged off-center within the first LED array 104 such that at least 70% of the second surface area 122 is arranged in one half (e.g. the two left quadrants) of the first surface area 120.

Figure 3:
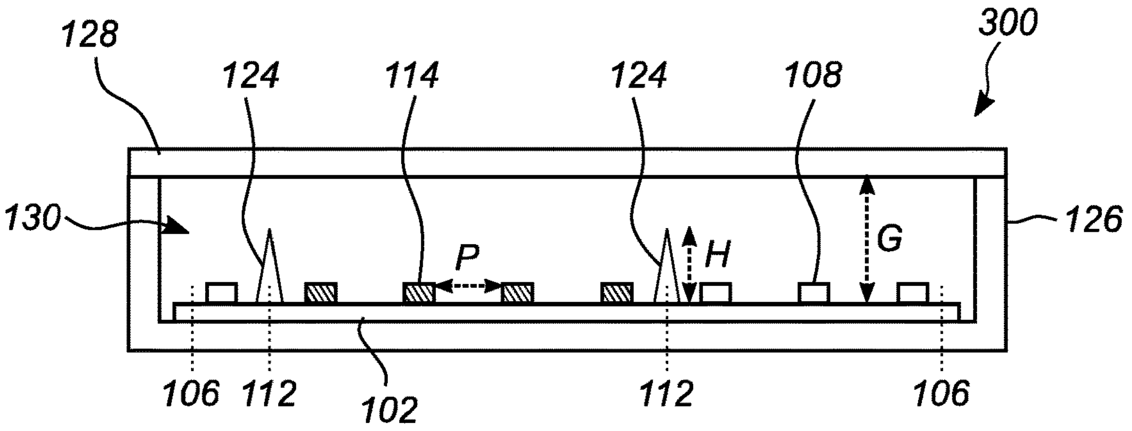
FIG. 3 is a cross-section of a light-emitting module, in accordance with some embodiments.

With reference to FIG. 3, light mixing within a LED module 300, in accordance with some embodiments, will be described.

FIG. 3 is a cross-section of a LED module 300 such as the LED module 100 described above with reference to FIGS. 1 and 2.

The substrate 102, the first LEDs 108, the second LEDs 114, the first perimeter 106 and the second perimeter 112 may be equivalent to the corresponding features described above with reference to FIGS. 1 and 2 and will not be further described herein with reference to FIG. 3.

The LED module 300 in FIG. 3 further comprises a housing 126, in which the substrate 102 (and the LEDs disposed on it) is arranged. A semi-reflective light-exit window 128 is arranged above the substrate 102 such that the substrate, the housing 126 and the light-exit window 128 form a mixing chamber 130. In the mixing chamber 130, light from the different LEDs 108, 114 may reflect on surfaces of the mixing chamber 130. Reflection within the mixing chamber 130 may cause a re-direction of light. Light may thus exit the LED module 300 in more directions or angles, which may give the light emitted by the light-emitting module 300 a softer or less sharp appearance.

For example, the semi-reflectivity of the light-exit window may ensure that some light emitted by the LEDs 108, 114 is reflected back into the mixing chamber 130, to be further mixed before being coupled out through the semi-reflective light-exit window 128. At least the upper surface of the substrate and/or the inner surfaces of the housing (i.e. the surfaces facing the mixing chamber 130) may be highly reflective. The substrate may for example have a reflectivity of at least 80%. Providing reflective surfaces delimiting (at least some portions of) the mixing chamber may increase mixing of the light within the mixing chamber.

In FIG. 3, an optical structure 124 is arranged along the second perimeter 112. This optical structure is arranged to redirect (reflect) light from the first LEDs 108 towards the first area outside the second perimeter 112, and to redirect second light from the second LEDs 114 towards the second area inside the second perimeter 112. Thus, the first light emitted by the first LEDs 108 is mixed, and the second light emitted by the second LEDs 114 is mixed, while mixing between the first light and second light is reduced.

In order for avoiding or at least reducing the occurrence of a sharp line between the light emitted by the first LED array (in the first area, outside the second perimeter 112) and the light emitted by the second LED array (in the second area, inside the second perimeter 112), a height H of the optical structure 124 may be related to the gap G between the substrate and the window 128 such that $0.3\leq H\leq 0{:}7G$. This may allow some mixing between the LEDs of the first LED array, outside the second perimeter, and the LEDs of the second LED array, inside the second perimeter.

Further, in order to improve mixing, the gap G may be related to the average pitch (distance) between the LEDs disposed on the substrate, such that $P\leq G\leq 4P$.

Figure 4:
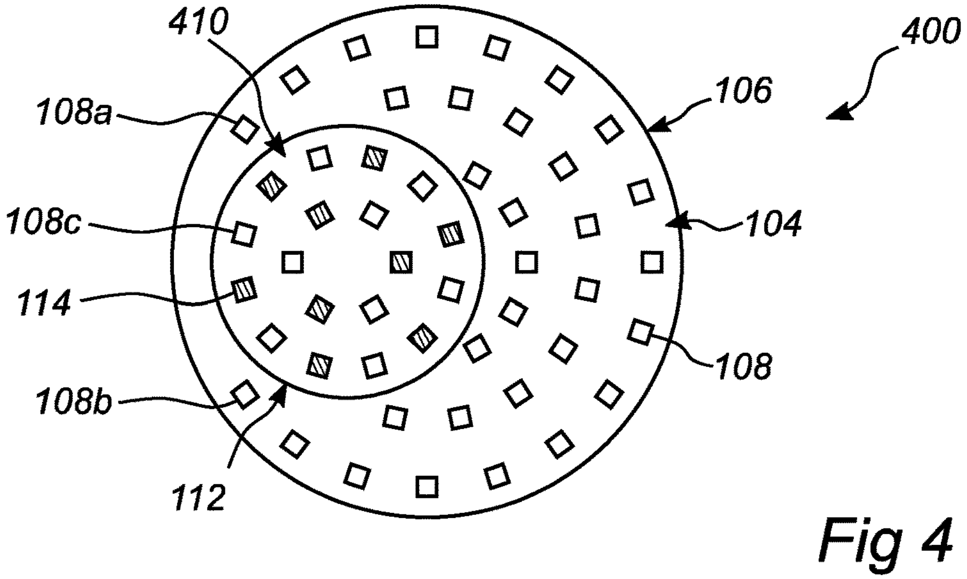
FIG. 4 is an illustration of a light-emitting module in which the second LED array comprises first LEDs, in accordance with some embodiments.

With reference to FIG. 4, a light-emitting module 400 in accordance with some embodiments will be described.

The light-emitting module 400 illustrated in FIG. 4 may be equivalent to the light-emitting modules 100, 300 described above with reference to FIGS. 1-3, except in the arrangement of the LEDs 108, 108*a*-*c*, 114.

Firstly, the second LED array 410 is arranged closer to the first perimeter 106, such that the first LEDs 108 do not completely surround the second LED array. Rather, a gap is formed between two first LEDs 108*a*, 108*b*, along a portion of the second perimeter 112. The LEDs 108, 108*a*-*b* of the first LED array 104 are therefore arranged in a crescent, similar to a waning or waxing moon.

Secondly, in FIG. 4, the second LED array 110 of the light-emitting module 400 further comprises a plurality of first LEDs 108*c*. The second LED array 410 may therefore emit first light (using the first LEDs 108*c*), second light (using the second LEDs 114) or a combination of first light and second light.

As the first LED array 104, in the illustrated embodiment, comprises only first LEDs 108, the first array color temperature CT1 is the same as the first LED color temperature, i.e. CT1=T1.

The second array color temperature CT2, on the other hand, may be equal to the first LED color temperature T1, if the second LEDs 114 are turned off. Alternatively, it may be equal to the second LED color temperature T2 if the first LEDs 108*c* (i.e. the first LEDs located within the second perimeter or the first LEDs located in the second LED array) are turned off. Further, the second array color temperature CT2 may be varied in a range between T1 and T2 depending on the ratio of light emitted from the second LED array by the first LEDs 108*c* and the second LEDs 114.

The controller (not illustrated) may be configured to select a first mode and a second mode. In a first mode the first LED array 104 and the second LED array 410 emit light with the same array color temperature, i.e. (CT1=CT2=T1). In a second mode, the first LED array 104 may be turned off, or controlled to emit light with a lower intensity than in the first mode. The second LED array may, in the second mode, be controlled to emit light with the same color temperature, i.e. CT2=T1, as the first LED array or with a different color temperature (CT2≠T1) than the first LED array, such as the second LED color temperature CT2=$1_2$.

Figure 5:
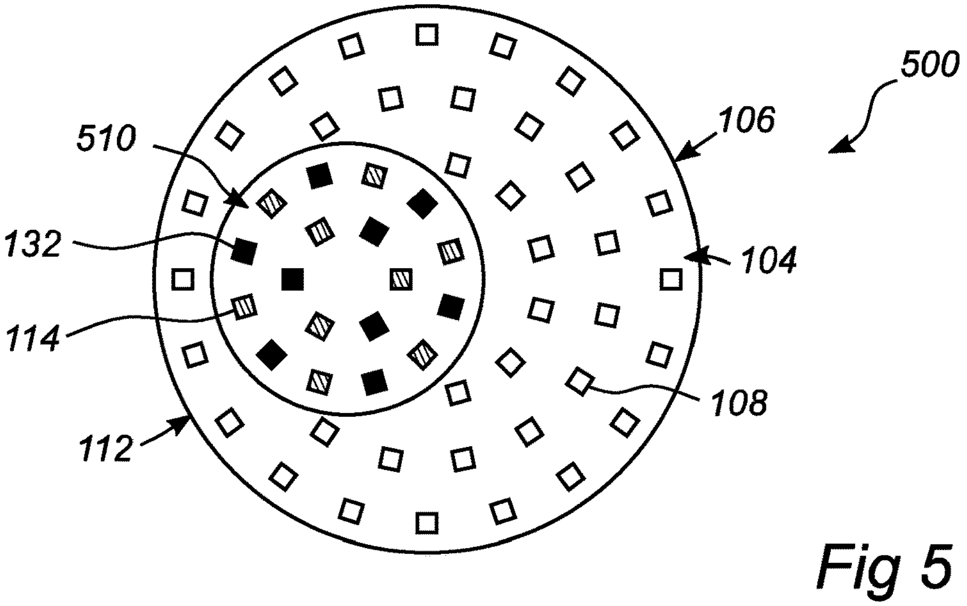
FIG. 5 shows a light-emitting module comprising third LEDs in accordance with some embodiments.

With reference to FIG. 5, a light-emitting module 500 having third LEDs 132 will be described.

The light-emitting module 500 illustrated in FIG. 5 may be equivalent to the light-emitting modules 100, 300 described above with reference to FIGS. 1-3, except that the second LED array 510 further comprises third LEDs 132.

The third LEDs 132 may be adapted to emit third light, which may have a third LED color temperature T3. The second LED array 510 may therefore emit second light, third light, or a combination of second light and third light.

The third LED color temperature may be related to the first LED color temperature such that T1-T3≥500 K.

In some embodiments, a combination of second light and third light may provide a second array color temperature which is at least substantially equivalent to the first array color temperature.

The person skilled in the art realizes that the present invention by no means is limited to the preferred embodiments described above. On the contrary, many modifications and variations are possible within the scope of the appended claims.

For example, the first and/or second LED array may comprise more LEDs of other types.

Although features and elements are described above in particular combinations, each feature or element can be used alone without the other features and elements or in various combinations with or without other features and elements.

Additionally, variations to the disclosed embodiments can be understood and effected by the skilled person in practicing the claimed invention, from a study of the drawings, the disclosure, and the appended claims. In the claims, the word "comprising" does not exclude other elements, and the indefinite article "a" or "an" does not exclude a plurality. The mere fact that certain features are recited in mutually different dependent claims does not indicate that a combination of these features cannot be used to advantage.

The invention claimed is:

1. A light-emitting module comprising:

a first light-emitting diode, LED, array being arranged on a substrate and having a first perimeter, said first LED array comprising a plurality of first LEDs configured to emit first light;

a second LED array being arranged on the substrate and having a second perimeter smaller than said first perimeter, said second LED array comprising a plurality of second LEDs configured to emit second light; and a controller configured to individually control the first LED array and the second LED array, wherein the second LED array is arranged off-center within said first LED array and, wherein said first perimeter encloses a first surface area and said second perimeter encloses a second surface area, and wherein at least 70% of the second surface area is arranged in one half of the first surface area wherein an optical structure is arranged along the second perimeter to redirect said first light and said second light toward the substrate and/or toward a housing in which the substrate is arranged.

2. The light-emitting module of claim 1, further comprising a semi-reflective light exit window configured to couple out light emitted by the first LED array and the second LED array, wherein said optical structure has a height (H) which is in the range of 0.3-0.7 times a gap (G) between said substrate and said semi-reflective window.

3. The light-emitting module of claim 1, wherein said first perimeter is circular and has a first radius R1 and said second perimeter is circular and has a second radius R2, and wherein said first and second radii fulfil the relation 0.3R1≤R2≤0.8R1.

4. The light-emitting module of claim 1, wherein first LEDs of the first LED array are arranged surrounding the second LED array.

5. The light-emitting module of claim 1, wherein said second LED array further comprises first LEDs, wherein said first light has a first LED color temperature T1 and said second light has a second LED color temperature T2, and wherein a difference between the first LED color temperature T1 and the second LED color temperature T2 is larger than 500 K.

6. The light-emitting module of claim 5, wherein the first LED color temperature T1 is lower than, or equal to, 3500 K and the second LED color temperature T2 is higher than, or equal to, 4000 K.

7. The light-emitting module of claim 1, wherein said second LED array is free of first LEDs, wherein said first light has a first LED color temperature T1 and said second light has a second LED color temperature T2, and wherein a difference between the first LED color temperature T1 and the second LED color temperature T2 is smaller than 300 K.

8. The light-emitting module of claim 1, wherein said second LED array further comprises third LEDs configured to emit third light having a third LED color temperature T3, and wherein a first LED color temperature T1 of the first light is at least 500 K higher than the third LED color temperature T3.

9. The light-emitting module of claim 1, further comprising a semi-reflective light exit window configured to couple out light emitted by the LEDs of the first and second LED array, wherein a gap height (G) between the substrate and the semi-reflective light exit window is 1-4 times an average pitch (P) between the LEDs.

10. The light-emitting module of claim 1, wherein light emitted by said first LED array has a first array color temperature CT1;

light emitted by said second LED array has a second array color temperature CT2; and said controller is configured to select between at least two control modes, wherein:

in a first control mode, both the first LED array and the second LED array are turned on, and the second array color temperature CT2 is equal to the first array color temperature CT1; and in a second control mode, the second LED array is turned on, the first LED array being turned off, or the first LED array being turned on and controlled to emit light with a lower intensity than in the first control mode, the first array color temperature CT1 being the same as in the first control mode.

11. The light-emitting module of claim 10, wherein, in said second control mode, the second array color temperature CT2 is the same as the first array color temperature CT1.

12. The light-emitting module of any of claim 10, wherein, in said second control mode, the second array color temperature CT2 is different from the first array color temperature CT1.

13. A luminaire comprising a light-emitting module as defined in claim 1.

* * * * *